(12) United States Patent
Mohapatra et al.

(10) Patent No.: US 11,146,908 B2
(45) Date of Patent: Oct. 12, 2021

(54) GENERATING PERSONALIZED END USER HEAD-RELATED TRANSFER FUNCTION (HRTF) FROM GENERIC HRTF

(71) Applicant: SONY CORPORATION, Tokyo (JP)

(72) Inventors: Bibhudendu Mohapatra, San Diego, CA (US); James R. Milne, Ramona, CA (US); Gregory Carlsson, Santee, CA (US); Tonni Sandager Larsen, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/662,995

(22) Filed: Oct. 24, 2019

(65) Prior Publication Data

US 2021/0127223 A1    Apr. 29, 2021

(51) Int. Cl.
*H04S 7/00*      (2006.01)
*G06F 3/0488*    (2013.01)
*G06F 3/0482*    (2013.01)

(52) U.S. Cl.
CPC ............ *H04S 7/304* (2013.01); *G06F 3/0482* (2013.01); *G06F 3/04883* (2013.01); *H04S 7/307* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 6,181,800 B1 | 1/2001 | Lambrecht | |
| 6,795,556 B1 | 9/2004 | Sibbald et al. | |
| 7,634,092 B2 | 12/2009 | McGrath | |
| 7,720,229 B2 | 5/2010 | Duraiswami et al. | |
| 7,840,019 B2 | 11/2010 | Slaney et al. | |
| 8,452,036 B2 | 5/2013 | Sommer et al. | |
| 8,489,371 B2 | 7/2013 | Guillon et al. | |
| 8,503,682 B2 | 8/2013 | Fukui et al. | |
| 8,520,857 B2 | 8/2013 | Fukui et al. | |
| 8,787,584 B2 | 7/2014 | Nyström et al. | |
| 9,030,545 B2 | 5/2015 | Pedersen | |

(Continued)

FOREIGN PATENT DOCUMENTS

| CN | 105027580 B | 5/2017 |
|---|---|---|
| CN | 107172566 B | 1/2019 |

(Continued)

OTHER PUBLICATIONS

Milne et al., "Generating Personalized End User Room-Related Transfer Function (RRTF)", file history of related U.S. Appl. No. 16/681,632, filed Nov. 12, 2019.

(Continued)

*Primary Examiner* — James K Mooney
(74) *Attorney, Agent, or Firm* — John L. Rogitz (57) ABSTRACT

A personalized HRTF is generated from a generic HRTF by having a person don headphones, then select a generic HRTF model from a list. Test signals emulating sounds from a source at a specific virtual speaker location are played on the headphones, and the person indicates where he thinks the emulated sounds are coming from. Any difference between the virtual speaker location and the "heard" location is used to adjust the parameters (amplitude, phase, and frequency response) of the generic HRTF to render a HRTF personalized to the listening person.

17 Claims, 7 Drawing Sheets

(56) References Cited

U.S. PATENT DOCUMENTS

| | | | |
|---|---|---|---|
| 9,101,279 B2 | 8/2015 | Ritchey et al. | |
| 9,118,488 B2 | 8/2015 | Donaldson | |
| 9,118,991 B2 | 8/2015 | Nystrom et al. | |
| 9,167,368 B2 | 10/2015 | Jong et al. | |
| 9,448,405 B2 | 9/2016 | Yamamoto | |
| 9,544,706 B1 | 1/2017 | Hirst | |
| 9,591,427 B1 | 3/2017 | Lyren et al. | |
| 9,740,305 B2 | 8/2017 | Kabasawa et al. | |
| 9,848,273 B1* | 12/2017 | Helwani | H04R 25/552 |
| 9,854,362 B1 | 12/2017 | Milne et al. | |
| 9,900,722 B2 | 2/2018 | Bilinski et al. | |
| 9,924,289 B2 | 3/2018 | Trivi et al. | |
| 9,992,602 B1 | 6/2018 | Allen | |
| 10,003,905 B1 | 6/2018 | Milne et al. | |
| 10,149,089 B1 | 12/2018 | Edry et al. | |
| 10,154,365 B2 | 12/2018 | Silva | |
| 10,206,055 B1 | 2/2019 | Mindlin et al. | |
| 10,455,327 B2 | 10/2019 | Oswald et al. | |
| 10,492,018 B1 | 11/2019 | Allen | |
| 10,499,179 B1 | 12/2019 | Lyren | |
| 2004/0091119 A1 | 5/2004 | Duraiswami et al. | |
| 2006/0116930 A1* | 6/2006 | Goldstein | G06Q 30/02 705/14.49 |
| 2006/0282671 A1 | 12/2006 | Burton | |
| 2011/0137437 A1 | 6/2011 | Jonsson | |
| 2011/0314530 A1 | 12/2011 | Donaldson | |
| 2012/0014528 A1 | 1/2012 | Wang | |
| 2012/0201405 A1* | 8/2012 | Slamka | H04S 7/306 381/307 |
| 2013/0036452 A1 | 2/2013 | Yamashita | |
| 2013/0154930 A1 | 6/2013 | Xiang et al. | |
| 2013/0169779 A1 | 7/2013 | Pedersen | |
| 2013/0170679 A1 | 7/2013 | Nystrom et al. | |
| 2013/0177166 A1* | 7/2013 | Agevik | H04R 3/00 381/74 |
| 2013/0208899 A1 | 8/2013 | Vincent et al. | |
| 2014/0171195 A1 | 6/2014 | Searchfield et al. | |
| 2014/0185847 A1 | 7/2014 | Gran et al. | |
| 2015/0010160 A1 | 1/2015 | Udesen | |
| 2015/0063610 A1 | 3/2015 | Mossner | |
| 2015/0106475 A1 | 4/2015 | Tan et al. | |
| 2015/0256613 A1 | 9/2015 | Walker et al. | |
| 2015/0293655 A1 | 10/2015 | Tan | |
| 2015/0347735 A1 | 12/2015 | Yamashita | |
| 2016/0080577 A1 | 3/2016 | Norris et al. | |
| 2016/0100268 A1 | 4/2016 | Stein et al. | |
| 2016/0124707 A1 | 5/2016 | Ermilov et al. | |
| 2016/0142848 A1 | 5/2016 | Saltwell | |
| 2016/0269849 A1 | 9/2016 | Riggs et al. | |
| 2017/0078820 A1 | 3/2017 | Brandenburg et al. | |
| 2017/0094440 A1 | 3/2017 | Brown et al. | |
| 2017/0332186 A1 | 11/2017 | Riggs et al. | |
| 2018/0091921 A1 | 3/2018 | Silva | |
| 2018/0136898 A1 | 5/2018 | Shi et al. | |
| 2018/0139565 A1 | 5/2018 | Norris et al. | |
| 2018/0249276 A1 | 8/2018 | Godfrey | |
| 2018/0310115 A1* | 10/2018 | Romigh | H04S 3/008 |
| 2019/0007725 A1 | 1/2019 | Ferrer | |
| 2019/0200159 A1 | 6/2019 | Park et al. | |
| 2019/0215637 A1 | 7/2019 | Lee et al. | |
| 2020/0045491 A1 | 2/2020 | Robinson et al. | |
| 2020/0077222 A1 | 3/2020 | Nguyen et al. | |
| 2020/0104620 A1 | 4/2020 | Cohen et al. | |
| 2020/0107149 A1 | 4/2020 | Sunder et al. | |
| 2020/0260199 A1 | 8/2020 | Burwinkel et al. | |
| 2021/0185471 A1 | 6/2021 | Jot et al. | |

FOREIGN PATENT DOCUMENTS

| | | |
|---|---|---|
| JP | 2010520671 A | 6/2010 |
| JP | 2017092732 A | 5/2017 |
| KR | 20180051411 A | 5/2018 |
| WO | 2017116308 A1 | 7/2017 |
| WO | 2018110269 A1 | 6/2018 |
| WO | 2019059558 A1 | 3/2019 |

OTHER PUBLICATIONS

Yarra 3DX: The Most Advanced 3D Audio System in The World, Jul. 2016, retrieved from https://wwwkickstarter.com/projects/yarra3dx/yarra-3dx-the-most-advanced-3d-audio-system-in-the.

Politis et al., "Applications of 3D spherical transforms to personalization of head-related transfer functions", 2016 IEEE International Conference on Acoustics, Speech and Signal Processing (ICASSP), Mar. 2016.

"Hear an Entirely New Dimension of Sound", OSSIC, Retrieved from https://www.ossic.com/3d-audio/.

Dmitry N. Zotkin, Jane Hwang, Ramani Duraiswami, Larry S. Davis, "HRTF Personalization Using Anthropometric Measurements", Perceptual Interfaces and Reality Laboratory Institute for Advanced Computer Studies (UMIACS), University of Maryland (2003).

Henrik Moller, "Fundamentals of Binaural Technology", Acoustics Laboratory, Aalborg University, Mar. 3, 1992, Aalborg, Denmark.

James R. Milne, Gregory Carlsson, Tonni Sandager Larsen, "Global HRTF Repository", file history of related U.S. Appl. No. 16/424,313, filed May 28, 2019.

James R. Milne, Gregory Carlsson, Tonni Sandager Larsen, "Head Related Transfer Function (HRTF) as Biometric Authentication", file history of related U.S. Appl. No. 16/440,288, filed Jun. 13, 2019.

James R. Milne, Gregory Peter Carlsson, "Generating Personalized End User Head-Related Transfer Function (HRTF) Using Panoramic Images of Ear", file history of related U.S. Appl. No. 16/168,317, filed Oct. 23, 2018.

James R. Milne, Gregory Peter Carlsson, "Techniques Combining Plural Head-Related Transfer Function (HRTF) Spheres to Place Audio Objects", file history of related U.S. Appl. No. 16/424,983, filed May 29, 2019.

Slim Ghorbal, Renaud Seguier, Xavier Bonjour, "Process of HRTF Individualization by 3D Statistical Ear", Audio Engineering Society, Convention e-Brief 283, Presented at the 141st Convention, Sep. 29-Oct. 2, 2016, Los Angeles, CA.

Sridhar et al., "A Database of Head-Related Transfer Function and Morphological Measurements", Audio Engineering Society, Oct. 2017, New York.

Sylvia Sima, "HRTF Measurements and Filter Designs for a Headphone-Based 3D-Audio System", Faculty of Engineering and Computer Science, Department of Computer Science, University of Applied Sciences, Hamburg, Germany, Sep. 6, 2008.

Thibaut Carpentier. "Binaural synthesis with the Web Audio API". 1st Web Audio Conference (WAC), Jan. 2015, Paris, France. hal-01247528.

Farina et al., "Measuring Spatial MIMO Impulse Responses in Rooms Employing Spherical Transducer Array", AES, 2016.

Milne et al., "Techniques Combining Plural Head-Related Transfer Function (HRTF) Spheres to Place Audio Objects", related U.S. Appl. No. 16/424,983, Non-Final Office Action dated May 15, 2020.

Milne et al., "Techniques Combining Plural Head-Related Transfer Function (HRTF) Spheres to Place Audio Objects", related U.S. Appl. No. 16/424,983, Applicant's response to Non-Final Office Action filed May 27, 2020.

James R. Milne, Gregory Carlsson, Tonni Sandager Larsen, "Global HRTF Repository", related U.S. Appl. No. 16/424,313, Non-Final Office Action dated Aug. 6, 2020.

James R. Milne, Gregory Carlsson, Tonni Sandager Larsen, "Global HRTF Repository", related U.S. Appl. No. 16/424,313, Applicant's response to Non-Final Office Action filed Sep. 17, 2020.

James R. Milne, Gregory Peter Carlsson, "Generating Personalized End User Head-Related Transfer Function (HRTF) Using Panoramic Images of Ear", related U.S. Appl. No. 16/168,317, Non-Final Office Action dated Aug. 4, 2020.

James R. Milne, Gregory Peter Carlsson, "Generating Personalized End User Head-Related Transfer Function (HRTF) Using Pan- (56) References Cited

OTHER PUBLICATIONS oramic Images of Ear", related U.S. Appl. No. 16/168,317, Applicant's response to Non-Final Office Action dated Sep. 17, 2020.
Milne et al., "Techniques Combining Plural Head-Related Transfer Function (HRTF) Spheres to Place Audio Objects", related U.S. Appl. No. 16/424,983, Final Office Action dated Sep. 18, 2020.
James R. Milne, Gregory Carlsson, Tonni Sandager Larsen, "Global HRTF Repository", related U.S. Appl. No. 16/424,313, Final Office Action dated Dec. 17, 2020.
James R. Milne, Gregory Carlsson, Tonni Sandager Larsen, "Global HRTF Repository", related U.S. Appl. No. 16/424,313, Applicant's response to Final Office Action filed Dec. 28, 2020.
Thesaurus, Deviation Synonyms, Deviation Antonyms, (Year:2011).
Milne et al., "Techniques Combining Plural Head-Related Transfer Function (HRTF) Spheres to Place Audio Objects", related U.S. Appl. No. 16/424,983, Applicant's response to Final Office Action filed Nov. 10, 2020.
Milne et al., "Techniques Combining Plural Head-Related Transfer Function (HRTF) Spheres to Place Audio Objects", related U.S. Appl. No. 16/424,983, Non-Final Office Action dated Jun. 11, 2021.
Zotkin et al., "Rendering Localized Spatial Audio in a Virtual Auditory Space", in IEEE Transactions on Multimedia, vol. 6, No. 4, pp. 553-564, Aug. 2004, doi: 10.1109/TMM.2004.827516 (Year: 2004).
James R. Milne, Gregory Carlsson, Tonni Sandager Larsen, "Head Related Transfer Function (HRTF) as Biometric Authentication",related U.S. Appl. No. 16/440,288, Non-Final Office Action dated Mar. 17, 2021.
James R. Milne, Gregory Carlsson, Tonni Sandager Larsen, "Head Related Transfer Function (HRTF) as Biometric Authentication",related U.S. Appl. No. 16/440,288, Applicant's response to Non-Final Office Action filed May 5, 2021.
Sonada et al., "User Authentication Scheme Using Individual Auditory Pop-Out", New Directions in Intelligent Interactive Multimedia. Studies in Computational Intelligence, vol. 142. Berlin, Heidelberg, 2008.
Milne et al., "Generating Personalized End User Room-Related Transfer Function (RRTF)", related U.S. Appl. No. 16/681,632, Non-Final Office Action dated Jan. 11, 2021.
Milne et al., "Generating Personalized End User Room-Related Transfer Function (RRTF)", U.S. Appl. No. 16/662,995, Applicant's response to Non-Final Office Action filed Jan. 29, 2021.

\* cited by examiner

GENERATING PERSONALIZED END USER HEAD-RELATED TRANSFER FUNCTION (HRTF) FROM GENERIC HRTF

FIELD

The present application relates generally to generating personalized end user head-related transfer functions (HRTF) using generic HRTF.

BACKGROUND

Binaural or head-related transfer function (HRTF) calibration currently requires expensive equipment made by specialized manufacturers. This method of calibration requires a microphone to be inserted into each ear and frequency sweeps played from individual speakers surrounding the listening position. Alternatively, pictures of the face and each ear of an individual can be taken to create a personalized HRTF model/file. This method suffers from inaccuracy in producing good HRTFs.

SUMMARY

Accordingly, a set of headphones and a smart device running a specialized application is provided to aid a person in creating his own HRTF model/file from a generic HRTF.

In one aspect, a system includes at least one computer medium that is not a transitory signal and that in turn includes instructions executable by at least one processor to receive indication of a perceived origin of sound played on a headphone. The instructions are executable to identify a virtual location from whence the sound is emulated to originate, and based on the perceived origin and the virtual location, alter a first head related transfer function (HRTF) to establish a personalized HRTF for a person making the indication.

In non-limiting examples, the instructions are executable to alter the first HRTF based on a difference between the perceived origin and the virtual location. In some embodiments the indication of the perceived location is received from a touch sensitive display. The computer medium and processor may be implemented in a tablet computer or a wireless telephone, for example.

In example implementations the instructions may be executable to present on a display at least one user interface (UI) configured to allow selection of the first HRTF from among plural HRTFs. The plural HRTFs may be associated with respective speaker setups.

In another aspect, a method includes identifying a first head related transfer function (HRTF) and an emulated origination of sound played on headphones. The method also includes identifying a perceived origination of the sound played on the headphones, and based at least in part on a difference between the emulated origination and perceived origination, modifying the first HRTF. Modification of the first HRTF may be done by modifying one or more of an amplitude, phase, and frequency response associated with the first HRTF.

In another aspect, a consumer electronics (CE) device includes at least one touch sensitive display, at least one processor configured for controlling the display, and at least one computer storage bearing instructions executable by the processor to receive user selection of a first head related transfer function (HRTF). The instructions are executable to receive at least one user indication of an origination of sound, and based at least in part on the user indication, alter the first HRTF to render a personalized HRTF. Audio may be generated using the personalized HRTF.

In this aspect, the instructions may be executable to play sound on headphones emulated to be from a virtual origination, and alter the first HRTF based at least in part on a difference between the virtual origination and the origination of sound indicated by the user. If desired, the instructions may be executable to present on the display a first selector selectable to adjust the first HRTF to alter the first HRTF according to the origination of sound relative to the virtual origination. The instructions further may be executable to present on the display a second selector selectable to cause an emulated speaker location associated with the virtual origination to be moved to the origination of sound indicated by the user.

The details of the present application, both as to its structure and operation, can be best understood in reference to the accompanying drawings, in which like reference numerals refer to like parts, and in which:

DETAILED DESCRIPTION

U.S. Pat. No. 9,854,362 is incorporated herein by reference and describes details of finite impulse response (FIR) filters mentioned below. U.S. Pat. No. 10,003,905, incorporated herein by reference, describes techniques for generating head related transfer functions (HRTF) using microphones.

This disclosure accordingly relates generally to computer ecosystems including aspects of multiple audio speaker ecosystems. A system herein may include server and client components, connected over a network such that data may be exchanged between the client and server components. The client components may include one or more computing devices that have audio speakers including audio speaker assemblies per se but also including speaker-bearing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12. The CE device 12 may be, e.g., a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is an example of a device that may be configured to undertake present principles (e.g. communicate with other devices to undertake present principles, execute the logic described herein, and perform any other functions and/or operations described herein).

Figure 1:
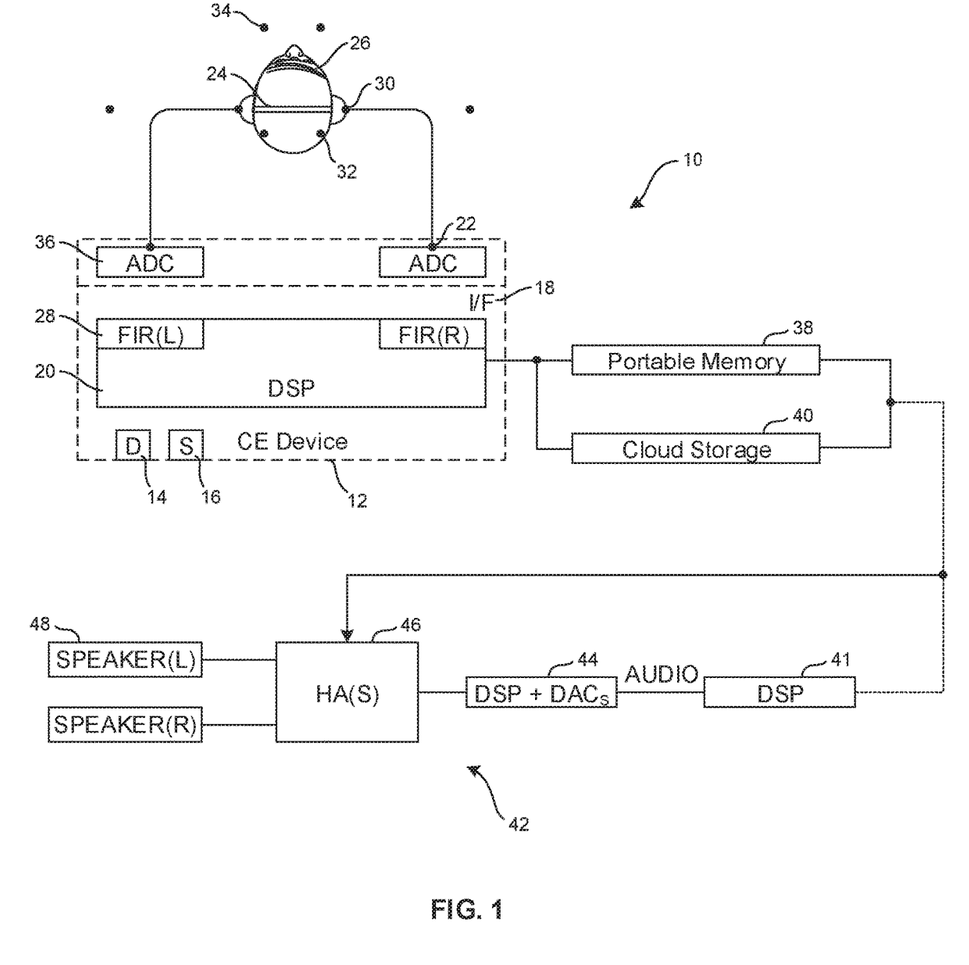
FIG. 1 is a block diagram of an example HRTF recording and playback system.

Accordingly, to undertake such principles the CE device 12 can be established by some or all of the components shown in FIG. 1. For example, the CE device 12 can include one or more touch-enabled displays 14, and one or more speakers 16 for outputting audio in accordance with present principles. The example CE device 12 may also include one or more network interfaces 18 for communication over at least one network such as the Internet, a WAN, a LAN, etc. under control of one or more processors 20 such as but not limited to a DSP. It is to be understood that the processor 20 controls the CE device 12 to undertake present principles, including the other elements of the CE device 12 described herein. Furthermore, note the network interface 18 may be, e.g., a wired or wireless modem or router, or other appropriate interface such as, e.g., a wireless telephony transceiver, Wi-Fi transceiver, etc.

In addition to the foregoing, the CE device 12 may also include one or more input ports 22 such as, e.g., a USB port to physically connect (e.g. using a wired connection) to another CE device and/or a headphone 24 that can be worn by a person 26. The CE device 12 may further include one or more computer memories 28 such as disk-based or solid-state storage that are not transitory signals on which is stored files such as the below-mentioned HRTF calibration files. The CE device 12 may receive, via the ports 22 or wireless links via the interface 18 signals from first microphones 30 in the earpiece of the headphones 24, second microphones 32 in the ears of the person 26, and third microphones 34 external to the headphones and person, although only the headphone microphones may be provided in some embodiments. The signals from the microphones 30, 32, 34 may be digitized by one or more analog to digital converters (ADC) 36, which may be implemented by the CE device 12 as shown or externally to the CE device.

As described herein, the signals from the microphones can be used to generate HRTF calibration files that are personalized to the person 26 wearing the calibration headphones. A HRTF calibration file typically includes at least one and more typically left ear and right ear FIR filters, each of which typically includes multiple taps, with each tap being associated with a respective coefficient. By convoluting an audio stream with a FIR filter, a modified audio stream is produced which is perceived by a listener to come not from, e.g., headphone speakers adjacent the ears of the listener but rather from relatively afar, as sound would come from an orchestra for example on a stage that the listener is in front of.

To enable end users to access their personalized HRTF files, the files, once generated, may be stored on a portable memory 38 and/or cloud storage 40 (typically separate devices from the CE device 12 in communication therewith, as indicated by the dashed line), with the person 26 being given the portable memory 38 or access to the cloud storage 40 so as to be able to load (as indicated by the dashed line) his personalized HRTF into a receiver such as a digital signal processor (DSP) 41 of playback device 42 of the end user. A playback device may include one or more additional processors such as a second digital signal processor (DSP) with digital to analog converters (DACs) 44 that digitize audio streams such as stereo audio or multi-channel (greater than two track) audio, convoluting the audio with the HRTF information on the memory 38 or downloaded from cloud storage. This may occur in one or more headphone amplifiers 46 which output audio to at least two speakers 48, which may be speakers of the headphones 24 that were used to generate the HRTF files from the test tones. U.S. Pat. No. 8,503,682, owned by the present assignee and incorporated herein by reference, describes a method for convoluting HRTF onto audio signals. Note that the second DSP can implement the FIR filters that are originally established by the DSP 20 of the CE device 12, which may be the same DSP used for playback or a different DSP as shown in the example of FIG. 1. Note further that the playback device 42 may or may not be a CE device.

In some implementations, HRTF files may be generated by applying a finite element method (FEM), finite difference method (FDM), finite volume method, and/or another numerical method, using 3D models to set boundary conditions.

Figure 2:
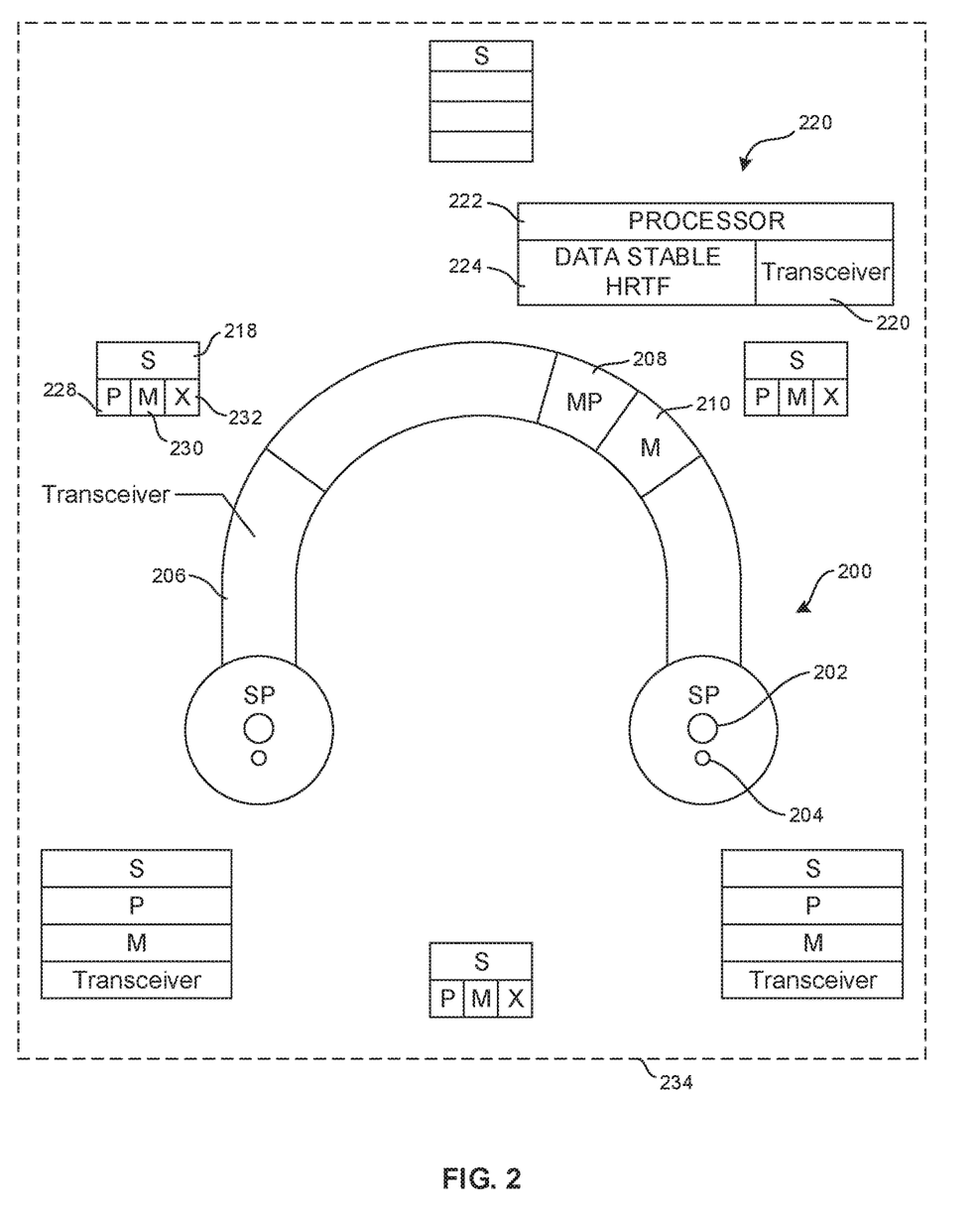
FIGS. 2 and 3 are block diagrams of example HRTF recording systems.
Figure 3:
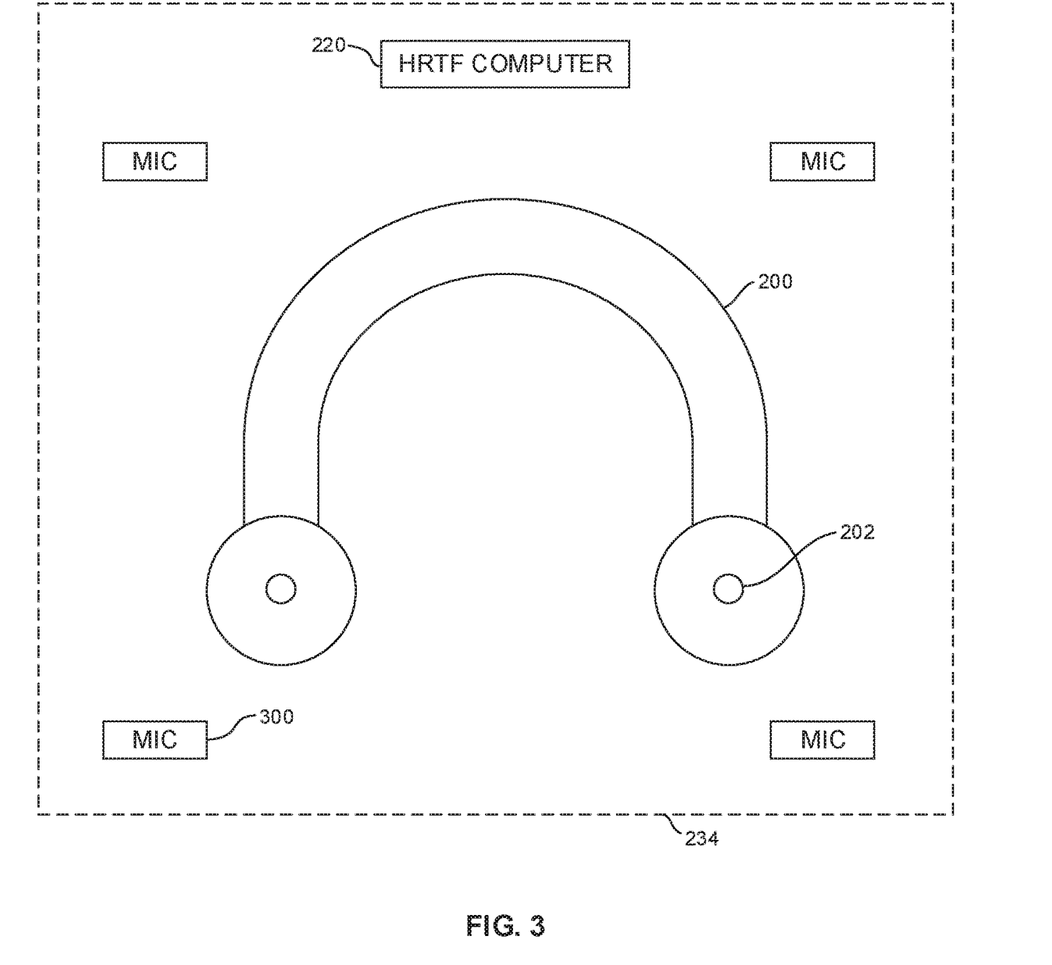

FIGS. 2 and 3 show respective HRTF file generation systems. In FIG. 2, a person (not shown) may wear headphones 200 with left and right earphone speakers 202. In lieu of or adjacent to each speaker 202 may be a respective microphone 204 for playing HRTF calibration test tones.

In the example shown, the headphones 200 may include one or more wireless transceivers 206 communicating with one or more processors 208 accessing one or more computer storage media 210.

In the example of FIG. 2, test tones from one or more speakers 218 may be played and picked up by the microphones 204, and signals from the microphones 204 may be sent via the transceiver 206 or through a wired connection to a HRTF generation computer 220, which typically includes a processor 222, computer storage 224, and communication interface 226, as well as other appropriate computers such as any described herein. Also, each speaker 218 may include a speaker processor 228 accessing speaker computer storage 230 and communicating via wired or wireless links with the computer 220 via a communication interface 232. In the example shown, test tones or other test sounds are generated by plural speakers surrounding the headphones 200 within a space 234. The space 234 may be a room of the end user's dwelling, with HRTF files being generated for each room and then the HRTF file corresponding to a room in which the end user wishes to listen to audio being selected. Or, the space 234 may be an anechoic-coated or other special sound recording room. Yet again, to generate a venue specific HRTF that is independent of a person and later concatenated with a person's HRTF, the space 234 may be the venue itself, e.g., Carnegie Hall, Sadler's Wells, Old Vic, the Bolshoi theater, etc. U.S. Pat. No. 8,787,584, owned by the present assignee and incorporated herein by reference, describes a method for establishing HRTF files to account for the size of a human head. U.S. Pat. No. 8,520,857, owned by the present assignee and incorporated herein by reference, describes a method for determining HRTF. This patent also describes measuring a HRTF of a space with no dummy head or human head being accounted for.

FIG. 3 illustrates an embodiment that in all essential respects is identical to that of FIG. 2, except that instead of test audio being played on external speakers and picked up on microphones in the headphones 200, test audio is played on the speakers 202 of the headphones 200 and picked up by one or more microphones 300 that are external to the headphones 200 and in communication with the HRTF computer 220.

Figure 4:
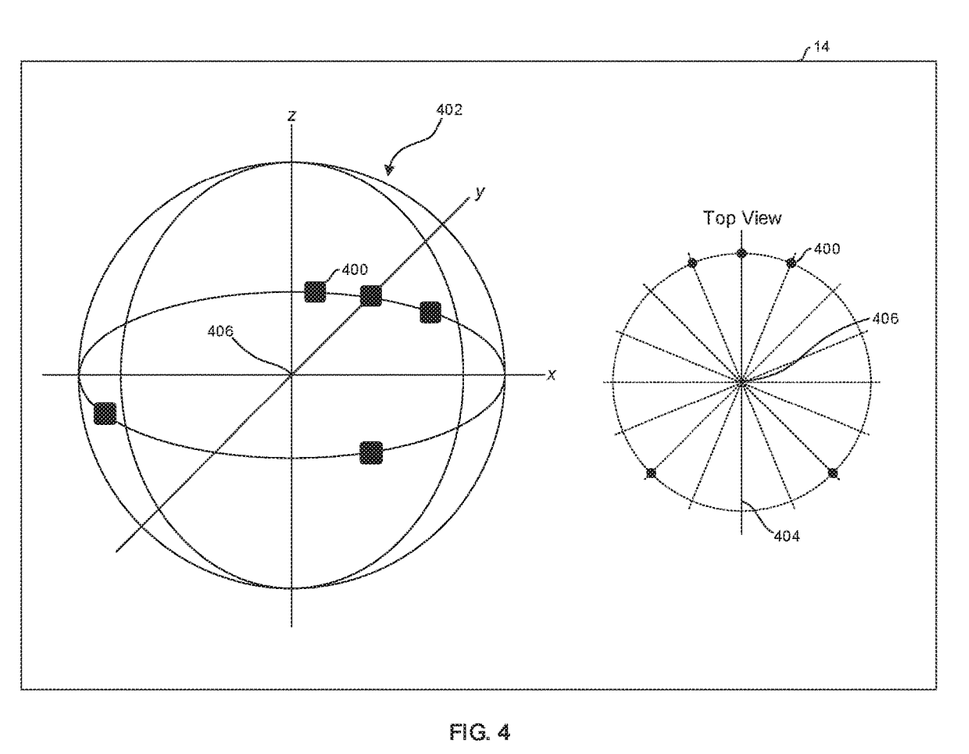
FIG. 4 is a schematic diagram showing a 3D and 2D overhead view of an example speaker arrangement.

FIG. 4 illustrates a model speaker layout that may be presented as a user interface (UI) on, for example, the display 14 of the CE device 12. The depicted layout shows a 3D view of locations 400 of modeled speakers arranged on or in a sphere 402. It is to be understood that while FIG. 4 illustrates a 5.1 speaker setup, present principles apply to other speaker setups, e.g., 5.1.4 (with speakers at different heights as well as different azimuths), 13.1, etc.

The UI in FIG. 4 may also contain a "slice" view 404 of the sphere 402. In the example shown, the slice view 404 is a top view that shows all five speakers in the same horizontal plane arranged at respective azimuths from the center 406 of the sphere 402. In addition or alternatively, an elevation view of the speakers may be shown for, e.g., a 5.1.4 layout.

Figure 5:
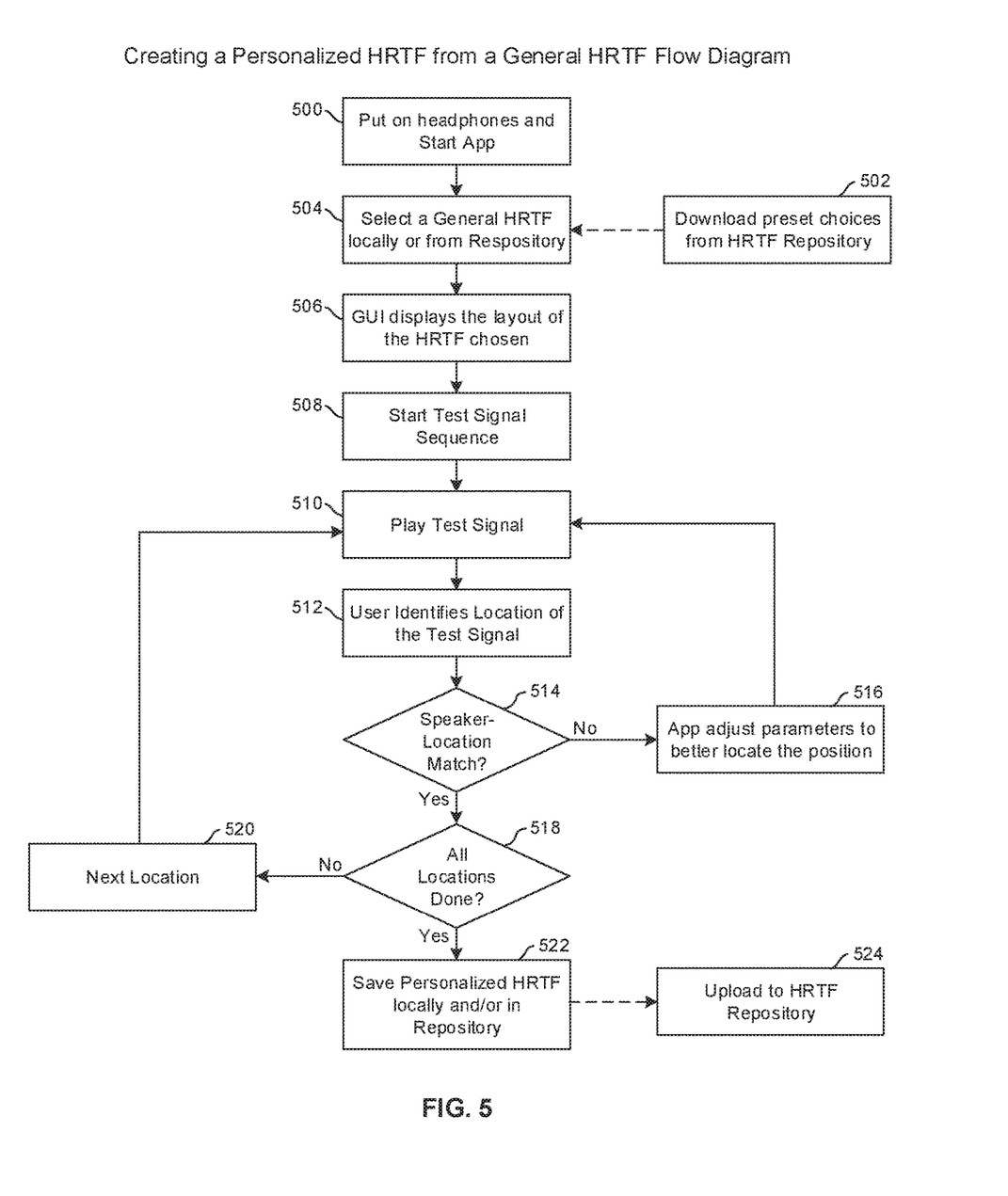
FIG. 5 is a flow chart of example logic consistent with present principles.

FIG. 5 illustrates logic consistent with present principles to derive a personalized HRTF for a person using either of the example physical setups in FIGS. 2 and 3 from a generic HRTF. In a non-limiting example, the machine-executed steps of the logic may be implemented as a computer application ("app") executed by the processor of the CE device 12.

Commencing at block 500, the person (also referred to herein as "user") dons any of the headphones described herein and the logic is invoked, e.g., by starting the application. Block 502 indicates that one or more generic HRTFs (e.g., a first HRTF for a 5.1 setup, a second HRTF for a 13.1 setup, or other generic HRTFs) are downloaded from, e.g., an Internet server, and at block 504 input is received from the user manipulating, e.g., the touch-sensitive display 14 or other input device selecting one of the generic HRTFs.

Proceeding to block 506, one or more of the UI of FIG. 4 or the UIs described further below are presented on, e.g., the display 14 of the CE device 12 showing the speaker setup associated with the HRTF selected at block 504. Moving from block 506 to block 508, a test signal sequence is commenced in which the logic moves to block 510 to play on the headphones test signal such as a tone or frequency sweep emulated to be from one of the virtual speaker locations in the speaker setup.

Proceeding to block 512, input is received from, e.g., a touch by the user on the display 14 indicating a location in the virtual space illustrated in the UI from whence the user perceives the test tone to originate. The logic determines at decision diamond 514 whether the perceived location received at block 512 matches the location of the virtual speaker from whence the test tone was emulated to originate.

If the locations do not match, the logic moves from decision diamond 514 to block 516 to adjust parameters (e.g., amplitude, phase, and frequency response) of the generic HRTF for the particular frequency of the test tone. In one non-limiting example, an acoustic model such as the model known as "WAON" from Cybernet of Japan may be used for the adjustment. The logic then loops back to block 510 to replay the test signal.

As indicated in FIG. 5, the above process may be repeated until a positive test is returned at decision diamond 514 (perceived location and emulated location of sound origination match), in which case the logic proceeds to decision diamond 518. At decision diamond 518 it is determined whether all emulated speaker locations (and if desired all emulated frequencies from each speaker location) have been tested. If not, the next speaker location (and/or next test frequency) is retrieved at block 520 and the logic loops back to block 510 to play the next frequency from an emulated origination location of the next speaker retrieved at block 520.

On the other hand, once it is determined that the testing is complete, i.e., that the HRTF parameters have been adjusted such that perceived locations match all emulated speaker locations of test tone origination, the logic saves the adjusted HRTF, now modified from the generic HRTF in a way that is personalized to the user, at block 522. The adjusted ("personalized") HRTF for the user may be saved locally and/or on an Internet server, from whence it may be provided at block 524 to an HRTF repository that can be accessed via the Internet by the user or by providers of music or other audio such as a service that the user might subscribe to. The service might bill the user extra for providing audio using the user's personalized HRTF.

In this way, personal HRTF calibration is provided to the prosumer or consumer without the use a lot of special equipment or technical knowledge. The personalized HRTF can be modified as often as the user desires. The user can create multiple personalized HRTF models/files and save them.

Once the personalized HRTF is saved, the user can recall the HRTF on a given platform or device and listen to music with that selected HRTF.

The methodology described above is for headphone applications. It is to be understood that present techniques may be used for sound bars, portable speakers, or other audio systems.

Figure 6:
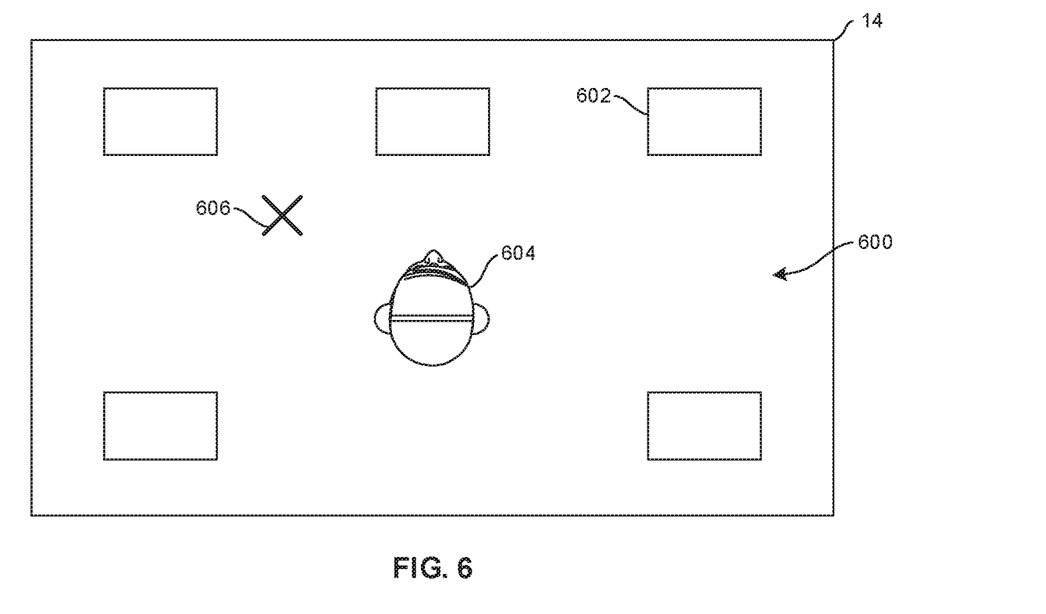
FIGS. 6-8 are example user interfaces consistent with present principles.
Figure 7:
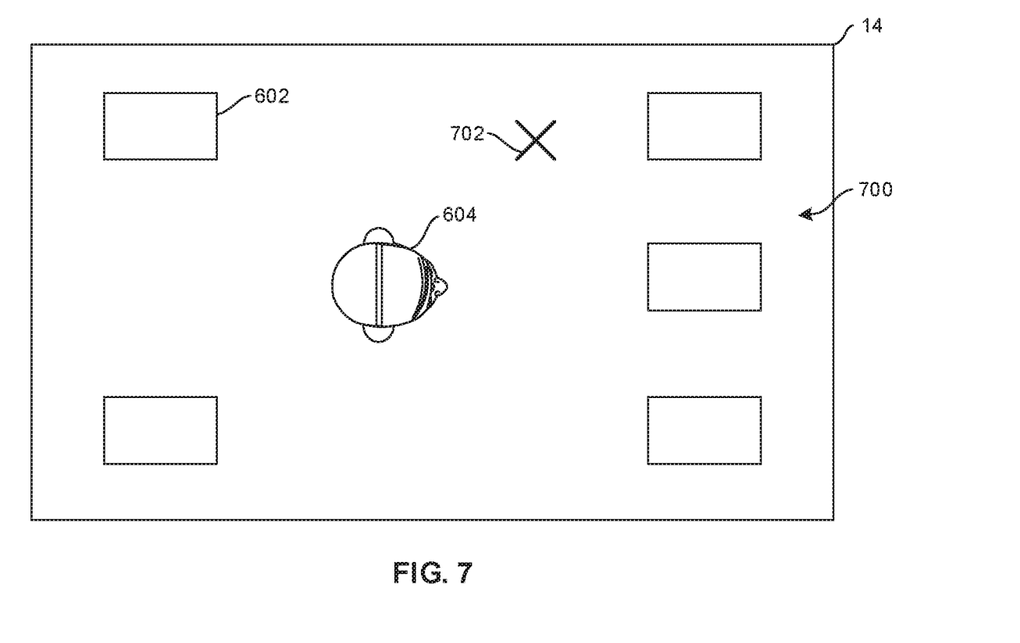
Figure 8:
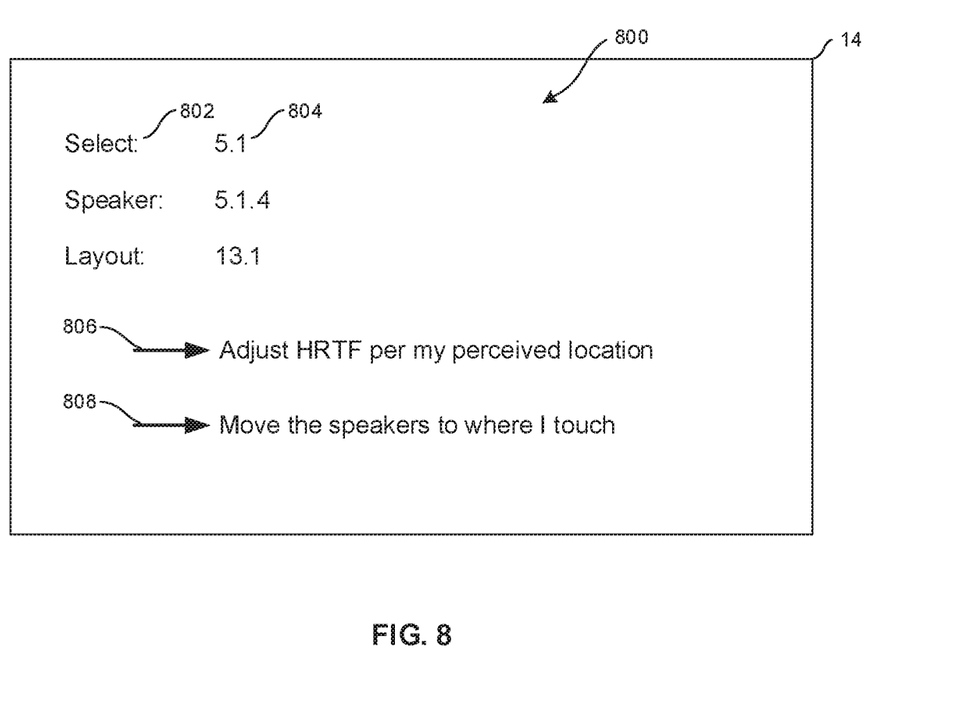

FIGS. 6-8 illustrate example UIs consistent with the description above. FIG. 6 shows a UI 600 that is a top plan view of virtual speaker locations 602 while FIG. 7 shows a UI 700 that is a side elevation view of the virtual speaker locations 602. The location 604 of the user also is shown. The number of speakers in the UIs 600, 700 is for example only.

As shown in FIG. 6, the user has indicated at 606 (by, e.g., touching the display 14) a perceived location of test tone origination. FIG. 7 illustrates at 702 a similar indication of perceived test tone origination. Note that the perceived locations 606, 702 do not match any of the emulated locations of the depicted virtual speakers.

FIG. 8 illustrates a further UI 800. A prompt 802 may be presented for the user to select from a list 804 a desired speaker setup (and, hence, a generic HRTF). A first selector 806 may be presented consistent with principles described above in FIG. 5 and selectable to adjust the generic HRTF to "move" the perceived test tone origination location to the emulated location of one of the virtual speakers (e.g., the emulated speaker location nearest the perceived location). If desired, however, a second selector 808 may be presented and selectable to cause the emulated locations of speakers to be moved to locations defined by where the user touches the display.

While the particular embodiments are herein shown and described in detail, it is to be understood that the subject matter which is encompassed by the present invention is limited only by the claims.

What is claimed is:

1. An apparatus comprising:
at least one processor configured with instructions to:
receive indication of a perceived origin of sound played on a headphone;
identify a virtual location from whence the sound is emulated to originate; and
based on the perceived origin and the virtual location, alter a first head related transfer function (HRTF) selected from plural HRTFs to establish a personalized HRTF for a person making the indication, the plural HRTFs being associated with respective speaker setups.

2. The apparatus of claim 1, wherein the instructions are executable to:
alter the first HRTF based on a difference between the perceived origin and the virtual location.

3. The apparatus of claim 1, wherein the indication of the perceived location is received from a touch sensitive display.

4. The apparatus of claim 1, wherein the processor is implemented in a tablet computer.

5. The apparatus of claim 1, wherein the processor is implemented in a wireless telephone.

6. An apparatus comprising:
at least one processor configured with instructions to:
receive indication of a perceived origin of sound played on a headphone;
identify a virtual location from whence the sound is emulated to originate;
based on the perceived origin and the virtual location, alter a first head related transfer function (HRTF) to establish a personalized HRTF for a person making the indication; and
present on a display at least one user interface (UI) configured to allow selection of the first HRTF from among plural HRTFs.

7. A method comprising:
identifying a first head related transfer function (HRTF) based on user selection of the first HRTF;
identifying an emulated origination of sound played on headphones;
identifying a perceived origination of the sound played on the headphones; and
based at least in part on a difference between the emulated origination and perceived origination, modifying the first HRTF.

8. The method of claim 7, comprising modifying the first HRTF at least in part by modifying an amplitude associated with the first HRTF based at least in part on a difference between the emulated origination and perceived origination.

9. The method of claim 7, comprising modifying the first HRTF at least in part by modifying a phase associated with the first HRTF based at least in part on a difference between the emulated origination and perceived origination.

10. The method of claim 7, comprising modifying the first HRTF at least in part by modifying a frequency response associated with the first HRTF based at least in part on a difference between the emulated origination and perceived origination.

11. The method of claim 7, comprising identifying the perceived origination of the sound played on the headphones based on user input.

12. The method of claim 11, wherein the user input is received from a computer electronics (CE) device.

13. A consumer electronics (CE) device comprising:
at least one display;
at least one processor configured with instructions to:
receive user selection of a first head related transfer function (HRTF);
play sound on headphones emulated to be from a virtual origination;
receive at least one user indication of an origination of sound;
present on the display a first selector selectable to adjust the first HRTF to alter the first HRTF according to the user indication of the origination of sound relative to the virtual origination;
alter the first HRTF based at least in part on a difference between the virtual origination and the origination of sound indicated by the user to render a personalized HRTF; and
generate audio using the personalized HRTF.

14. The CE device of claim 13, wherein the CE device comprises a wireless telephone.

15. The CE device of claim 13, wherein the CE device comprises a tablet computer.

16. The CE device of claim 13, wherein the user selection of the first HRTF is from a list of HRTFs each being associated with a respective speaker setup.

17. The CE device of claim 13, wherein the instructions are executable to:
present on the display a second selector selectable to cause an emulated speaker location associated with the virtual origination to be moved to the origination of sound indicated by the user.

* * * * *